(12) United States Patent
Gusat et al.

(10) Patent No.: US 7,948,888 B2
(45) Date of Patent: May 24, 2011

(54) NETWORK DEVICE AND METHOD FOR OPERATING NETWORK DEVICE

(75) Inventors: Mircea Gusat, Langnau (CH); Ronald Peter Luijten, Thalwil (CH); Cyriel Johan Minkenberg, Gutenswil (CH)

(73) Assignee: International Business Machines Corporation, Armonk, NY (US)

( * ) Notice: Subject to any disclaimer, the term of this patent is extended or adjusted under 35 U.S.C. 154(b) by 189 days.

(21) Appl. No.: 12/327,862

(22) Filed: Dec. 4, 2008

(65) Prior Publication Data

US 2009/0147679 A1   Jun. 11, 2009

(30) Foreign Application Priority Data

Dec. 5, 2007   (EP) ..................................... 07122358

(51) Int. Cl.
*H04L 12/26* (2006.01)
(52) U.S. Cl. ..................... 370/232; 370/235; 370/395.4; 370/395.7; 370/412; 709/231; 709/250; 711/167
(58) Field of Classification Search .......................... None
See application file for complete search history.

(56) References Cited

U.S. PATENT DOCUMENTS

| | | | |
|---|---|---|---|
| 7,675,857 B1 * | 3/2010 | Chesson | 370/235 |
| 2007/0070901 A1 | 3/2007 | Aloni | 370/230 |
| 2008/0056295 A1 * | 3/2008 | Loda et al. | 370/437 |
| 2008/0130669 A1 * | 6/2008 | Loeb et al. | 370/412 |

* cited by examiner

*Primary Examiner* — Chi H. Pham
*Assistant Examiner* — Shick Hom
(74) *Attorney, Agent, or Firm* — Gail H. Zarick; William Stock; Anne Vachon Dougherty

(57) ABSTRACT

A network device including at least one rate-limited-queue and multiple timer modules, the network device being operable to receive and/or transmit data flows from and/or to a communication network. Each data flow includes multiple data packets. The network device being further operable to limit the predetermined transmission rate of the respective data flow dependent on whether a data congestion in the communication network has been indicated, in such a way, that in case of an indicated congested communication network a respective timer module is associated to each of the data flows and/or each group of data flows, whereas the data packets of the respective data flows and/or group of data flows are buffered in the rate-limited-queue. Each data packet in the rate-limited-queue is transmitted with a limited transmission rate predetermined by the respectively associated timer module when the data packet is at the head of the rate-limited-queue.

20 Claims, 6 Drawing Sheets

NETWORK DEVICE AND METHOD FOR OPERATING NETWORK DEVICE

CROSS-REFERENCE TO RELATED APPLICATIONS

This application claims priority under 35 U.S.C. §119 from European Patent Application No. 07122358.0 filed Dec. 5, 2007, the entire contents of which are incorporated herein by reference.

BACKGROUND OF THE INVENTION

1. Field of the Invention

The present invention relates to network devices. It further relates to a method for operating the network device.

2. Description of the Related Art

In today's communication network systems, data congestion may occur when a network node receives more data packets at its input than it is able to process. Data congestion may also occur when data packets transition from a faster transport infrastructure to a slower transport infrastructure. In this regard, the network node and the slower transport infrastructure become a bottleneck for data packet transfers.

U.S. patent application Ser. No. 11/537,256 filed Sep. 29, 2006 and published as US20070070901A1 discloses a method and/or a system for quality of service and congestion management for converged network interface devices. The system for quality of service and congestion management comprises a transmit processor being operable to rate limit flows of data packets either statically based on a per-class basis or dynamically when the transmit processor receives congestion management packets from a filter being operable to classify incoming management data packets from the communication network.

Therefore, it is a challenge to provide a network device enabled to handle data congestion in a communication network efficiently. It is a further challenge to provide a method for operating the network device, which handles data congestions in a communication network.

SUMMARY OF THE INVENTION

According to one aspect of an embodiment of the invention, a network device including an interface to receive and/or transmit data flows from and/or to a communication network; multiple timer modules that associate with a data flow and/or a group of data flows when data congestion in the communication network is indicated; and at least one rate-limited-queue which buffers the data flow when data congestion in the communication network is indicated; wherein data packets in the data flow are transmitted from the rate-limited-queue with a transmission rate predetermined by the respectively associated timer module when each data packet is at the head of the rate-limited-queue.

The rate-limited-queue is used to buffer data packets of data flows and/or group of data flows being limited in their transmission rate for transmission by the network device. The data packets are buffered in the rate-limited-queue dependent on whether a data congestion in the communication network has been indicated. By limiting the transmission rates when data congestion is indicated, a more reliable and efficient way of data packet transmission is possible. A respective timer module is associated to each of the data flows and/or each group of data flows as long as data packets of the respective data flow and/or group of data flows are buffered in the at least one rate-limited-queue. The group of data flows includes data flows being transmitted with identical transmission rates. The respective timer module is adjusted in particular in such a way that the associated transmission rate is limited to a value below a maximum achievable transmission rate of the network device. The maximum achievable transmission rate is predetermined by the technology of the current communication network and/or network device. By associating a respective timer module to each data flow and/or each group of data flows while buffering the data packets of the respective data flow and/or respective group of data flows in the at least one rate-limited-queue, an efficient use of the available queues is possible. The data packet of the respective data flow and/or group of data flows is transmitted if it is at the head of the rate-limited-queue, whereas the head of the rate-limited-queue is the last position of the data packet within the queue before the data packet is transmitted to the communication network.

According to a preferred embodiment of the first aspect, the network device includes at least one non-rate-limited-queue operable to buffer data packets of the respective data flow and/or the respective group of flows and, in case of a non-congested communication network, to transfer the data packets with an unlimited transmission rate.

The unlimited transmission rate yielding a maximum transmission rate being predetermined by the technology of the communication network and/or network device. The data packets of the respective data flow and/or group of data flows are buffered preferably in the at least one non-rate-limited-queue as long as no data congestion exists in the communication network. This ensures a maximum throughput of data packets in case of a non-congested communication network.

According to a further preferred embodiment of the first aspect, the network device is operable to adjust the respective timer module dependent on the data congestion indication of the communication network.

By adjusting the respective timer module dependent on the data congestion indication of the communication network, a more flexible way of data flow transmission can be achieved. A preferred adjustment of the associated timer module can be achieved if the adjustment is further dependent on the respective priority and/or destination address and/or source address of the respective data flow. This can ensure a higher transmission rate for higher priority data flows, as for example for network management data packets, and a lower transmission rate for non-management data packets, for example data flows transmitting user data.

According to a further preferred embodiment of the first aspect, a network device includes an intermediate queue. The network device is operable to buffer at least one remaining data packet of the respective data flow and/or the respective group of data flows to the intermediate queue in case of a switch from the indication of congested to non-congested communication network.

The data packets in the intermediate queue are typically transmitted with the unlimited transmission rate. By buffering at least one data packet in the intermediate queue in case of a switch from the indication of congested to non-congested communication network, a maximum throughput of data packets is possible. In addition, blocking of data packets with unlimited transmission rates can be avoided by buffering the respective data packets in the intermediate queue.

According to a further preferred embodiment of the first aspect, the network device is operable to mark a data packet of the respective data flow and/or the respective group of data flows buffered in one queue if at least one subsequent data packet of the respective data flow and/or the respective group of data flows is buffered in a different queue than the marked data packet. The network device is further operable to switch from the one queue to the other queue for data packet transmission dependent on the marked data packet at the head of the one queue.

Before transmitting data packets of the respective data flow and/or group of data flows buffered in one queue, a tracking for preceding data packets in another queue and their respective transmission is necessary to prevent out-of-order transmission of data packets of the respective data flow and/or respective group of data flows. By marking one data packet of the respective data flow and/or respective group of data flows in a queue, out-of-order transmission can be prevented in an easy and efficient way when subsequent data packets of the respective data flow and/or the respective group of data flows are buffered in a different queue and switch from the one queue to the other queue for data packet transmission dependent on the marked data packet at the head of the one queue.

According to a further preferred embodiment of the first aspect, the network device is operable to insert an idle data packet associated to the respective data flow and/or the respective group of data flows into one queue and to mark the idle data packet, while at least one subsequent data packet of the respective data flow and/or the respective group of data flows is buffered in a different queue than the marked idle data packet. The network device is further operable to switch from the one queue to the other queue for data packet transmission dependent on the marked data packet at the head of the one queue.

The idle data packet is associated to the respective data flow and/or the respective group of data flows and typically includes no data to be transmitted to the communication network. The idle data packet is typically inserted in one respective queue if subsequent data packets of the respective data flow and/or the respective group of data flows are buffered in another queue. By switching to the other queue dependent on the idle data packet at the head of the one queue and reading data packets for transmission from the other queue, out-of-order transmission can be prevented in an easy way.

According to a further preferred embodiment of the first aspect, the network device includes a marker bit associated to each buffer entry in the respective queue. The network device is operable to mark the data packet of the respective data flow and/or the respective group of data flows by setting its marker bit.

By setting the respective marker bit to mark a data packet of the respective data flow and/or respective group of data flows in one queue, when subsequent data packets of the respective data flow and/or group of data flows are buffered in a different queue, out-of-line transmission can be prevented in an easy and efficient way.

According to a further preferred embodiment of the first aspect, the network device includes a memory device being operable to store a to-queue-entry and a from-queue-entry for each data flow and/or each group of data flows, wherein the to-queue-entry predetermines the queue where data packets of the respective data flow and/or the respective group of data flows are buffered to and the from-queue-entry predetermines where data packets of the respective data flow and/or the respective group of data flows are read from for transmission.

A to-queue-entry and a from-queue-entry are associated to each data flow and/or each group of data flows. By tracking the respective queue to buffer data packets in and tracking the queue to read data packets for transmission, a simple and reliable association of queues to data flows and/or group of data flows can be achieved. The to-queue-entry and the from-queue-entry for each data flow and/or each group of data flows can comprise identical queues or different queues.

According to a further preferred embodiment of the first aspect, the network device includes a finite-state-machine being operable to modify the to-queue-entries and the from-queue-entries of the memory device dependent on the data congestion indication of the communication network and dependent on a marked data packet in the respective queue.

The finite-state-machine is operable to modify the to-queue-entries and the from-queue-entries in the memory device dependent on the switches from the indication of congested to non-congested communication network and vice-versa and dependent on a marked data packet in the respective queue. This ensures a more reliable determination of queues for the to-queue-entry and for the from-queue-entry for the respective data flow and/or respective group of data flows.

According to a further preferred embodiment of the first aspect, the network device includes a congestion manager with multiple timer modules. The congestion manager is operable to indicate a data congestion in the communication network and to adjust the timer modules dependent on the indication of a data congestion.

The congestion manager adjusts the timer module associated to a data flow and/or group of data flows dependent on the indication of data congestion in the communication network. With the availability of multiple timer modules, preferably all processed data flows and/or groups of data flows can be associated to at least one timer module. This provides a respective transmission rate predetermined by the respective timer module for the respective data flow and/or the respective group of data flows when its data packets are at the head of the rate-limited-queue. The timer modules can be adjusted in different ways dependent on for example the priority and/or destination address and/or source address of the associated data flow.

According to a further preferred embodiment of the first aspect, the network device includes an enqueuing unit being operable to direct data packets of the respective data flow and/or the respective group of data flows to one of the queues dependent on the to-queue-entry in the memory device of the respective data flow and/or the respective group of data flows.

With the enqueuing unit, a reliable switch from one queue to another queue for directing incoming data packets can be achieved.

According to a further preferred embodiment of the first aspect, the network device includes a dequeuing unit being operable to select the data packet of the respective data flow and/or the respective group of data flows in one of the queues for transmission dependent on the from-queue-entry of the respective data flow and/or the respective group of data flows and, when the respective data packet is buffered in the at least one rate-limited-queue, dependent on the timer module associated to the respective data flow and/or the respective group of data flows.

With the dequeuing unit, a reliable switch from one queue to another queue for selecting a respective data packet for transmission can be achieved.

According to a further preferred embodiment of the first aspect, the network device is operable to give a signal indicating that at least one queue is filled to a given degree with data packets.

By indicating the degree of filling of data packets of at least one queue, it can be ensured that the network device is not overloaded. A data packet supplier, as for example, a computer being coupled to the network device or another network component in the communication network, can be informed of a pending overload situation of the network device, respectively if the degree of filling is set to a complete filling of at least one of the queues with data packets.

According to a second aspect of an embodiment of the invention, a method of operating a network device includes the steps of: receiving data flows from a communication network; associating a data flow and/or a group of data flows to a timer module when data congestion in the communication network is indicated; buffering the data flow in at least one rate-limited-queue when data congestion in the communication network is indicated; and transmitting to a communication network each data packet in the data flow with a transmission rate predetermined by the associated timer module when each data packet is at the head of the rate-limited-queue.

BRIEF DESCRIPTION OF THE DRAWINGS

The invention and its embodiments will be more fully appreciated by reference to the following detailed description of preferred embodiments, as illustrated by the accompanying drawings.

DETAILED DESCRIPTION OF THE PREFERRED EMBODIMENTS

Figure 1:
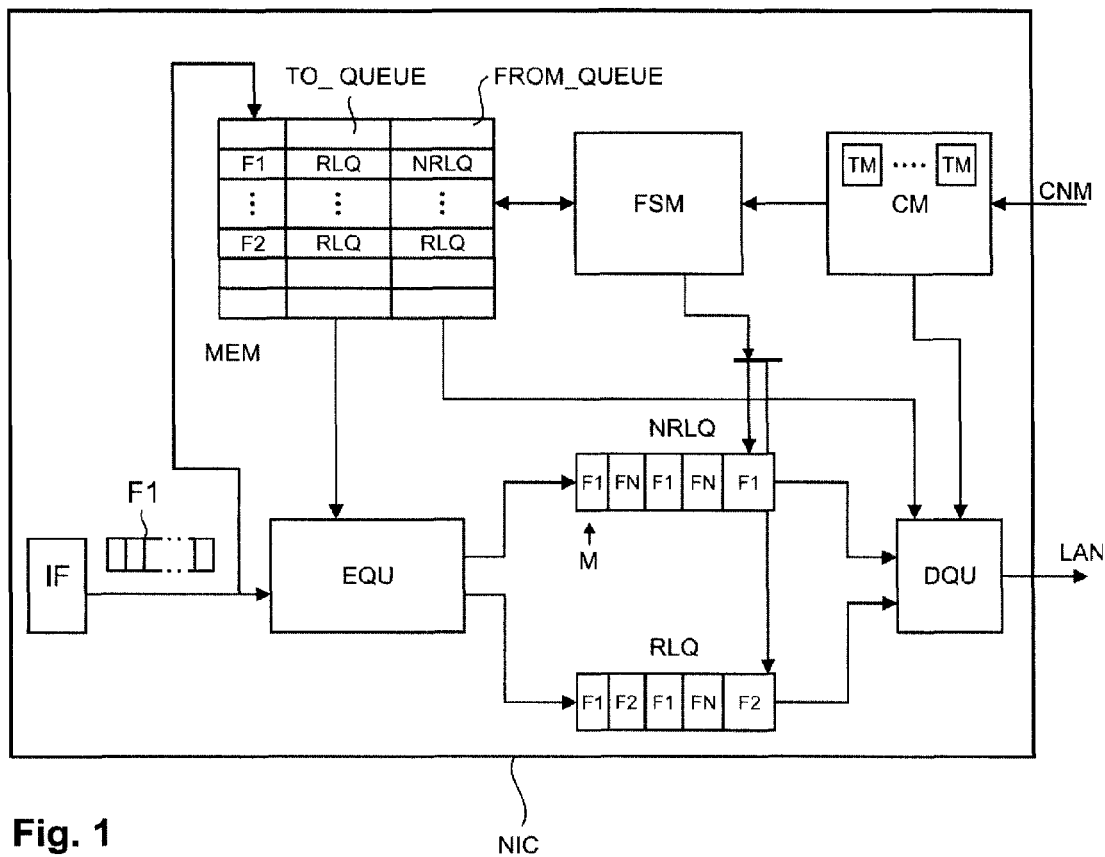
FIG. 1 is an exemplary representation of a network device.

FIG. 1 shows an exemplary representation of a network device NIC which includes a non-rate-limited-queue NRLQ and a rate-limited-queue RLQ. The network device NIC may be implemented as a network interface card interconnecting, for example, a computer with a communication network LAN, such as, a local area network. In addition, the network device may be implemented as a network component such as a network router or network switch operable to transmit and/or receive data packets to and/or from the communication network LAN.

Furthermore, the network device NIC includes an interface IF, which can be denoted as host interface. The interface IF may be a peripheral interconnect interface, referred to as a PCI, or other type of bus operable to interconnect the network device NIC with the associated computer. In addition, the network device NIC includes an enqueuing unit EQU and a memory device MEM with multiple to-queue-entries TO_QUEUE and multiple from-queue-entries FROM_QUEUE. The enqueuing unit EQU is coupled to the interface IF and to the memory device MEM at its input. The enqueuing unit EQU is further coupled to the tail of the non-rate-limited-queue NRLQ and to the tail of the rate-limited-queue RLQ at its output.

FIG. 1 further depicts an exemplary data flow F1 provided by the computer via interface IF. The data flow comprises multiple data packets, for example, Ethernet frames. The data packets of the respective data flow F1 include identical source and destination addresses and identical priorities. Therefore, the respective data flow F1 can be identified, for example, by a common source and destination address, as well as by a common priority.

The following description of the drawings is based on the transmission of data packets of the data flow F1. However, the invention is not limited only to the handling of one data flow. Multiple or all data flows can be processed by the network device NIC in the same way as described below.

The network device NIC further includes a congestion manager CM and a finite-state-machine FSM. The congestion manager CM processes information from the communication network LAN and indicates data congestion in the communication network LAN. Data congestion can occur when a network component, for example a network router or a network switch, receives more data packets at its particular input than it is able to process. For example, the particular network component transmits a data congestion message CNM to indicate a data congestion at its input. The data congestion message CNM is received by the congestion manager CM of the network device NIC. The data congestion message CNM can be a congestion-notification-message that includes a feedback value representing the degree of data congestion at the input of the particular network component. For example, the feedback value can comprise values from −256 to 255 with each value representing a different degree of data congestion. For example, −256 represents a total breakdown of the particular network component and 255 represents a non-overload situation.

The congestion manager CM includes multiple timer modules TM. Each timer module TM can be associated to a respective data flow and predetermines the transmission rate of the associated data flow. Timer modules are typically associated to data flows comprising data packets buffered in the rate-limited-queue RLQ. In a preferred embodiment, the respective timer module TM is adjusted dependent on the feedback value of the data congestion message CNM that indicates the data congestion in the communication network LAN. For example, the higher the degree of data congestion indicated by the feedback value of the data congestion message CNM, the lower the transmission rate of the respective data flow predetermined by the associated timer module.

The congestion manager CM is coupled to the finite-state-machine FSM which provides information about the status of the communication network LAN indicated by the data congestion message CNM. The finite-state-machine FSM is operable to modify the to-queue-entries TO_QUEUE and the from-queue-entries FROM_QUEUE dependent on the information supplied by the congestion manager CM for each data flow transmitted to the communication network LAN.

The network device NIC further includes a dequeuing unit DQU. The dequeuing unit DQU is coupled to the head of the non-rate-limited-queue NRLQ and to the head of the rate-limited-queue RLQ at its input and is coupled to the communication network LAN at its output. The dequeuing unit DQU is operable to select either the non-rate-limited-queue NRLQ or the rate-limited-queue RLQ and transmit the respective data packet at the head of the selected queue to the communication network LAN with its predetermined transmission rate. The selection of the queue is dependent on the respective data flow whose data packet is positioned at the head of the respective queue. The selection is further dependent on the from-queue-entry FROM_QUEUE of the memory device MEM that the respective data flow is associated to. If one timer module TM is associated to the respective data flow F1, the selection of the queue by the dequeuing unit DQU is also dependent on the associated timer module TM located in the congestion manager CM.

The timer module TM associated to a respective data flow may operate by comparing its counter reading against a predetermined time-stamp-value in order to determine a period of time after which the dequeuing unit DQU is controlled in such a way that the data packet of the respective data flow is transmitted by the dequeuing unit DQU to the communication network LAN. The respective time-stamp-value may be adjustable dependent on the value of the feedback value of the data congestion message CNM indicating the data congestion. Further, other types of timer modules are applicable besides using a timer module TM with a time-stamp-value.

Based on a detected and indicated data congestion from the congestion manager CM, the finite-state-machine FSM predetermines the rate-limited-queue RLQ for the respective to-queue-entry TO_QUEUE for the data flow F1, where data packets of the data flow F1 are buffered to. Prior to the detection of data congestion, preceding data packets of the data flow F1 directed to the non-rate-limited-queue NRLQ. The from-queue-entry FROM_QUEUE associated to the data flow F1 is not modified by the finite-state-machine FSM and predetermines the non-rate-limited-queue NRLQ, where data packets are transmitted from.

The exemplary data flow F1 is associated to the input of the enqueuing unit EQU. Based on the identification of the data flow F1 by its source and destination addresses and its priority, the network device NIC is able to scan the to-queue-entry TO_QUEUE of the memory device MEM to search for the respective queue to where data packets of the data flow F1 are buffered. Besides storing a to-queue-entry TO_QUEUE and a from-queue-entry FROM_QUEUE for each data flow processed by the network device NIC, the memory device MEM may store only entries for transmission rate limited data flows and not reference data flows buffered in the non-rate-limited-queue NRLQ. This provides a more efficient use of the memory device MEM and saves memory space. As shown in FIG. 1, the to-queue-entry TO_QUEUE of the data flow F1 predetermines the rate-limited-queue RLQ for buffering supplied data packets of the data flow F1. Using the respective to-queue-entry TO_QUEUE the memory device MEM controls the enqueuing unit EQU such that the data packets of the data flow F1 are directed to the rate-limited-queue RLQ. While data packets of the data flow F1 supplied after the indication of the data congestion are buffered in the rate-limited-queue RLQ, data packets of the data flow F1 already buffered in the non-rate-limited-queue NRLQ are still selected by the dequeuing unit DQU for transmission to the communication network LAN. The data packets buffered in the non-rate-limited-queue NRLQ are typically transmitted with an unlimited transmission rate. The unlimited transmission rate yields a maximum transmission rate predetermined by the technical implementation of the communication network LAN and/or the technical implementation of the network device NIC. For example a 10 G Ethernet communication network implementation provides a maximum achievable transmission rate of 10 GBit/s.

When data congestion in the communication network is indicated, buffering of further data packets to the non-rate-limited-queue NRLQ is prevented by the control of the enqueuing unit EQU by the associated to-queue-entry TO_QUEUE in the memory device MEM. As a result, a marker bit M is used to mark the last data packet of the data flow F1 in the non-rate-limited-queue NRLQ. For example, the marking of the last data packet of the data flow F1 can be indicated by setting the marker bit M of the respective data packet. The marked data packet of the data flow F1 is typically the last data packet selected for transmission from the non-rate-limited-queue NRLQ of the data flow F1.

The network device NIC can include a marker bit M for each buffer entry of the non-rate-limited-queue NRLQ and rate-limited-queue RLQ. The network device NIC can be operable to set the marker bit of the respective last data packet of each data flow in the respective queue. The finite-state-machine FSM is typically operable to detect a data packet with set marker bit M at the head of the respective queue. Dependent on the marker bit M detected at the head of the respective queue, the finite-state-machine FSM typically predetermines the queue that includes subsequent data packets of the respective data flow for the from-queue-entry FROM_QUEUE, for example, the queue predetermined by the to-queue-entry TO_QUEUE.

The identification of the last data packet of the data flow F1 in the respective queue can be simplified by inserting an idle data packet of the data flow F1 with set marker bit M. The idle data packet corresponds to the last data packet of the data flow F1 in the respective queue in case of a switch from the non-congested to congested communication network LAN or vice versa. The idle data packet typically includes no data to be transmitted to the communication network LAN. Subsequent data packets after the idle data packet are typically buffered in a different queue than the queue the idle data packet is buffered to.

The network device NIC can also be operable to mark the first data packet of the data flow F1 supplied after the switch from the non-congested to congested communication network LAN or vice versa. The marked data packet corresponds to the last data packet of the data flow F1 in the respective queue and is therefore still buffered in this queue, however, subsequent data packets are buffered in a different queue.

In the following description the last data packet of the data flow F1 in the respective queue, for example the idle data packet, is referred to as the marked data packet of the data flow F1.

The data flow F1, which includes at least one data packet buffered to the rate-limited-queue RLQ, is associated to at least one timer module TM located in the congestion manager CM. The associated timer module TM predetermines the transmission rate for the data packet (or data packets) buffered in the rate-limited-queue RLQ. The transmission rate predetermined by the associated timer module TM is typically below the maximum achievable transmission rate.

Detection of the data packet with set marker bit M at the head of the non-rate-limited-queue NRLQ allows the finite-state-machine FSM to modify the from-queue-entry FROM_QUEUE by predetermining the rate-limited-queue RLQ for the data flow F1. After transmission of the marked data packet of the data flow F1 in the non-rate-limited-queue NRLQ, the dequeuing unit DQU is controlled by the memory device MEM in such a way that the rate-limited-queue RLQ is predetermined for selecting subsequent data packets of the data flow F1 for transmission.

Figure 2A:
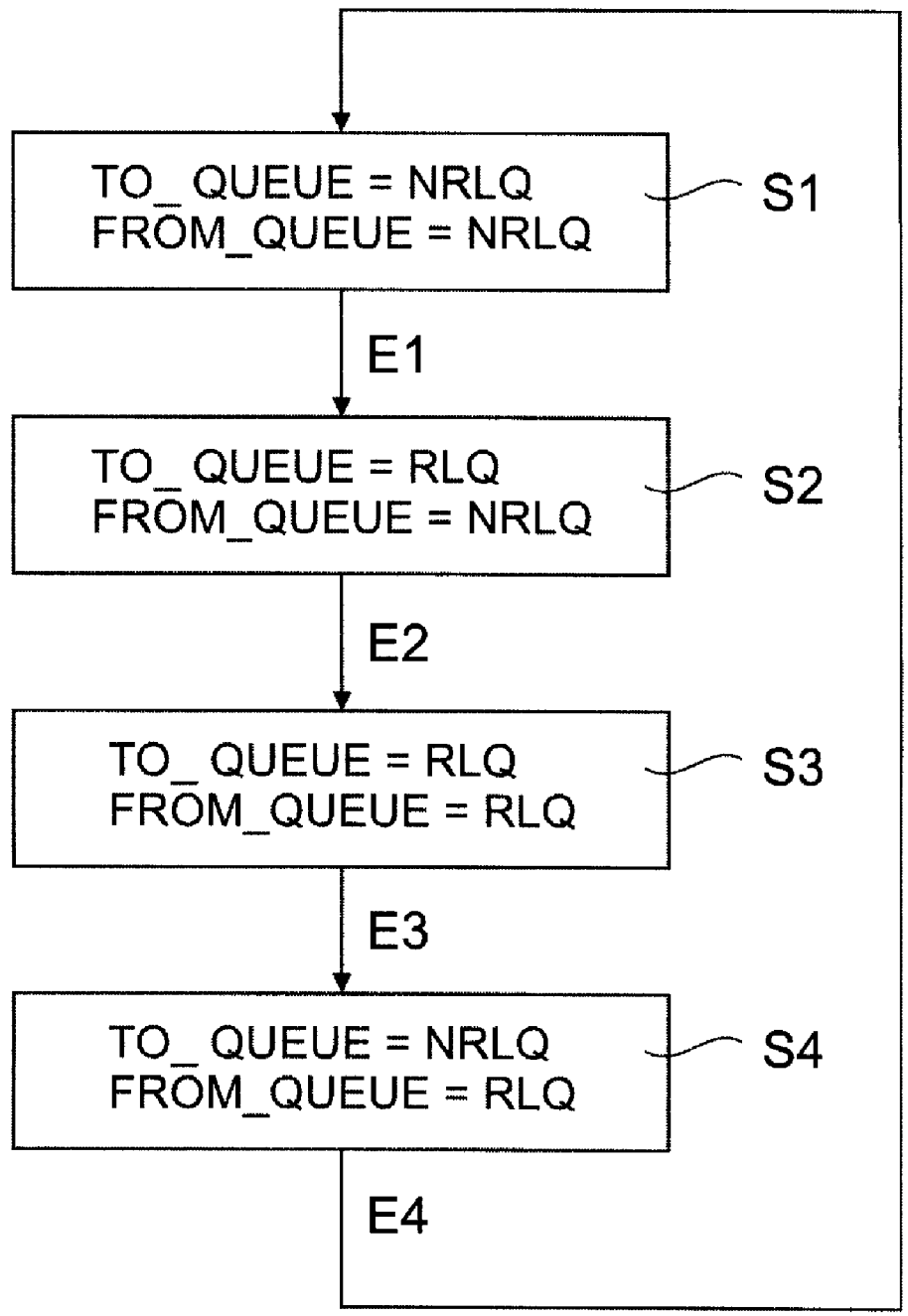
FIGS. 2a and 2b are exemplary state diagrams.

FIG. 2a illustrates a state diagram of the finite-state-machine FSM, where state transitions occur dependent on only one event per state. Based on the transmission of the data flow F1 in the non-congested communication network LAN, the finite-state-machine FSM starts in a first state S1. The first state S1 predetermines the non-rate-limited-queue NRLQ for both the to-queue-entry TO_QUEUE and the from-queue-entry FROM_QUEUE of the data flow F1 in memory device MEM. Using the to-queue-entry TO_QUEUE the memory device MEM controls the enqueuing unit EQU in such a way that data packets of the data flow F1, which were supplied by the computer via interface IF, are buffered to the non-rate-limited-queue NRLQ. Using the from-queue-entry FROM_QUEUE the memory device MEM controls the dequeuing unit DQU in such a way that data packets of the data flow F1 are read from the non-rate-limited-queue NRLQ for transmission. The predetermination of the non-rate-limited-queue NRLQ for buffering and transmission ensures the transmission of data packets of the data flow F1 with unlimited transmission rate.

The rate-limit-imposed-event E1 represents the indication of a data congestion in the communication network LAN by the congestion manager CM. When the rate-limit-imposedevent E1 occurs, the finite-state-machine FSM transitions to a second state S2. In the second state S2, the finite-state-machine FSM predetermines the rate-limited-queue RLQ for the to-queue-entry TO_QUEUE of the data flow F1 but the from-queue-entry FROM_QUEUE remains unchanged. Using the to-queue-entry TO_QUEUE the memory device MEM controls the enqueuing unit EQU in such a way that data packets of the data flow F1, which were further supplied by the computer via interface IF, now are buffered to the rate-limited-queue RLQ. Data packets of the data flow F1 transmitted to the communication network LAN are still read from the non-rate-limited-queue NRLQ. When switching from the non-congested to congested communication network LAN, the last data packet of the data flow F1 in the non-rate-limited-queue NRLQ is marked by setting its marker bit M. When data congestion is indicated, the congestion manager CM adjusts a respective timer module TM dependent on the data congestion message CNM indicating the data congestion. The congestion manager CM associates the respective timer module TM to the data flow F1. The respective timer module TM predetermines the transmission rate of the respective data packet of the data flow F1 located at the head of the rate-limited-queue RLQ by controlling the dequeuing unit DQU accordingly.

In cases where the non-rate-limited-queue NRLQ includes no data packets of the data flow F1 for transmission when the communication network LAN switches from non-congested to congested status, the marking of the last data packet of the data flow F1 in the non-rate-limited-queue NRLQ is typically not necessary. When switching from a non-congested to congested communication network LAN and further data packets are supplied after the switch, the rate-limited-queue RLQ is predetermined for both the to-queue-entry TO_QUEUE and the from-queue-entry FROM_QUEUE.

In cases where the rate-limited-queue RLQ includes no data packets of the data flow F1 for transmission when the communication network LAN switches from congested to non-congested status, the marking of the last data packet of the data flow F1 in the rate-limited-queue RLQ is typically not necessary. When switching from a congested to non-congested communication network LAN and further data packets of the data flow F1 are supplied after the switch, the non-rate-limited-queue NRLQ is predetermined for the to-queue-entry TO_QUEUE and for the from-queue-entry FROM_QUEUE.

In addition, the congestion manager CM can also consider the priority of the data flow F1 for adjustment of the respective timer module. This allows a priority dependent transmission rate determination for data flows with different priorities. The adjustment may be done in such a way that data packets of data flows with higher priorities are transmitted with higher transmission rates than data packets of data flows with lower priorities. Additionally, a reverse adjustment is also possible. Furthermore, the source and/or destination address of the respective data flow can be considered for the adjustment of the respective timer module.

The marker-at-head-of-NRLQ-event E2 represents the detection of the marked data packet of the data flow F1 at the head of the non-rate-limited-queue NRLQ while the communication network LAN is still congested. When the marker-at-head-of-NRLQ-event E2 occurs the finite-state-machine FSM transitions to a third state S3. In the third state S3 the finite-state-machine FSM predetermines the rate-limited-queue RLQ for the from-queue-entry FROM_QUEUE for the data flow F1 but the to-queue-entry TO_QUEUE remains unchanged. Using the to-queue-entry TO_QUEUE the memory device MEM controls the enqueuing unit EQU in such a way that data packets of the data flow F1 are buffered to the rate-limited-queue RLQ. Using the from-queue-entry FROM_QUEUE in consideration of the associated timer module TM the memory device MEM controls the dequeuing unit DQU in such a way that data packets of the data flow F1 are read from the rate-limited-queue RLQ for transmission after transmission of the marked data packet at the head of the non-rate-limited-queue NRLQ.

The rate-limit-removal-event E3 represents a detected removal of the data congestion in the communication network LAN. When the rate-limit-removal-event E3 occurs the finite-state-machine FSM transitions to a fourth state S4. With the fourth state S4, the finite-state-machine FSM predetermines the non-rate-limited-queue NRLQ for the to-queue-entry TO_QUEUE for the data flow F1 but the from-queue-entry FROM_QUEUE remains unchanged. Using the to-queue-entry TO_QUEUE the memory device MEM controls the enqueuing unit EQU in such a way that data packets of the data flow F1, which were further supplied by the computer via interface IF, now are buffered to the non-rate-limited-queue NRLQ. Data packets of the data flow F1 transmitted with limited transmission rates are still read from the rate-limited-queue RLQ. When switching from the congested to a non-congested communication network LAN, the last data packet of the data flow F1 in the rate-limited-queue RLQ is marked by setting its respective marker bit M.

The marker-at-head-of-RLQ-event E4 represents the detection of the marked data packet of the data flow F1 at the head of the rate-limited-queue RLQ while the communication network LAN is still non-congested. When the marker-at-head-of-RLQ-event E4 occurs the finite-state-machine FSM transitions back to the first state S1. Using the from-queue-entry FROM_QUEUE the memory device MEM controls the dequeuing unit DQU in such a way that data packets of the data flow F1 are read from the non-rate-limited-queue NRLQ for transmission after transmitting the marked data packet at the head of the rate-limited-queue RLQ. The timer module TM associated with the data flow F1 can be released if a further data congestion in the communication network LAN is not detected.

Figure 2B:
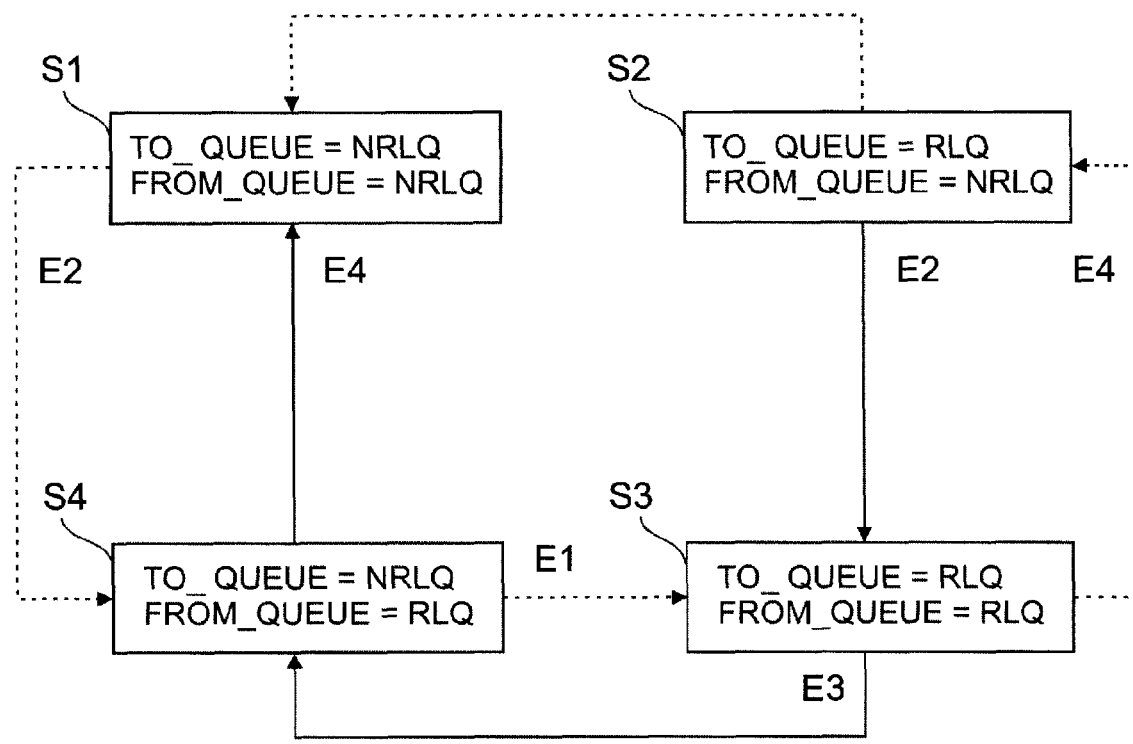

FIG. 2b illustrates an additional state diagram of the finite-state-machine FSM, where state transitions occur dependent on one or more events per state. The state diagram is basically identical to the state diagram depicted in FIG. 2a, however, additional events are added (illustrated in dashed lines) predetermining additional state transitions.

In some cases the rate-limit-removal-event E3 may occur while the finite-state-machine FSM is in the second state S2 before the marker-at-head-of-NRLQ-event E2 occurs. In this case, the finite-state-machine FSM transitions back to the first state S1 and predetermines the non-rate-limited-queue NRLQ for the to-queue-entry TO_QUEUE. Using the to-queue-entry TO_QUEUE the memory device MEM controls the enqueuing unit EQU in such a way that further supplied data packets of the data flow F1 are directed to the non-rate-limited-queue NRLQ again. The marker bit M remains set as configured in the second state S2 indicating the last data packet of the data flow F1 in the non-rate-limited-queue NRLQ transmits before subsequent data packets of the data flow F1 are read from the rate-limited-queue RLQ for transmission. With occurrence of the marker-at-head-of-NRLQ-event E2, the finite-state-machine FSM transitions to the fourth state S4. With the fourth state S4 the rate-limited-queue RLQ is predetermined for the from-queue-entry FROM_QUEUE and data packets of the data flow F1 are buffered in the rate-limited-queue RLQ for transmission. With occurrence of the marker-at-head-of-RLQ-event E4, the finite-state-machine FSM transitions back to the first state S1. With the first state S1, data packets of the data flow F1 in the non-rate-limited-queue NRLQ are read for transmission after the marked data packet in the rate-limited-queue RLQ is transmitted.

The network device NIC behaves analogous in cases where the rate-limit-imposed-event E1 occurs while the finite-state-machine FSM is in the fourth state S4 before the marker-at-head-of-RLQ-event E4 occurs. The finite-state-machine FSM transitions back to the third state S3 and predetermines the rate-limited-queue RLQ for the to-queue-entry TO_QUEUE again. The marker bit M remains set as configured in state S4 indicating the last data packet of the data flow F1 in the rate-limited-queue RLQ transmits before subsequent data packets of the data flow F1 are read from the non-rate-limited-queue NRLQ for transmission. With occurrence of the marker-at-head-of-RLQ-event E4 the finite-state-machine FSM transitions to the second state S2. With the second state S2 the rate-limited-queue RLQ is predetermined for the to-queue-entry TO_QUEUE. With occurrence of the marker-at-head-of-NRLQ-event E2, the finite-state-machine FSM transitions back to the third state S3. With the third state S3 data packets of the data flow F1 in the rate-limited-queue RLQ are read for transmission after the marked data packet in the non-rate-limited-queue NRLQ is transmitted.

Figure 3:
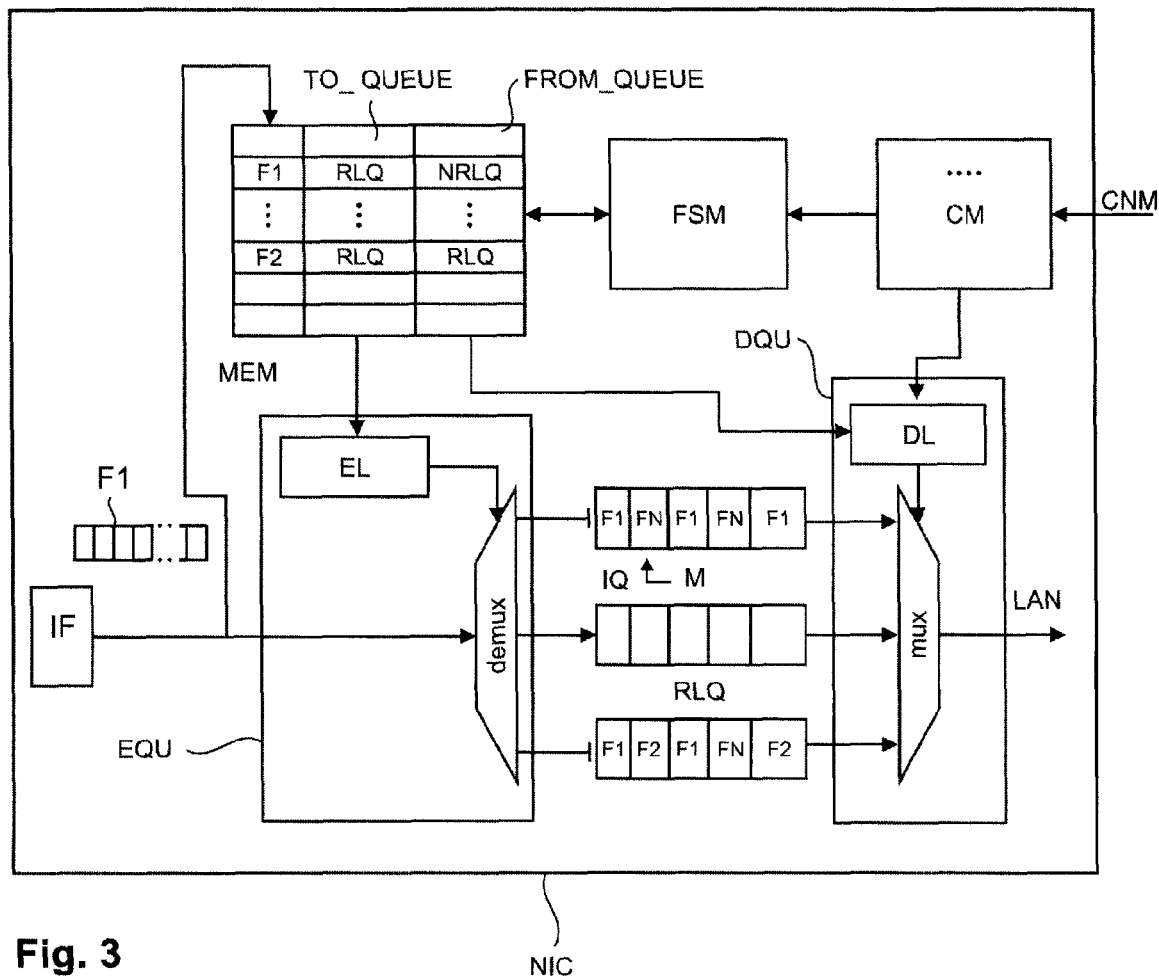
FIG. 3 is an exemplary representation of a network device with intermediate queue.

FIG. 3 illustrates a further representation of the network device NIC including an additional intermediate queue IQ. The intermediate queue IQ is coupled to the enqueuing unit EQU at its tail and is coupled to the dequeuing unit DQU at its head. The enqueuing unit EQU is depicted in more detail to include a first selection unit DEMUX and an enqueuing-logic-unit EL controlling the first selection unit DEMUX. The first selection unit DEMUX may be implemented as a demultiplexer unit and directs the incoming data packets of the data flows to the tail of the predetermined queue dependent on the respective to-queue-entries TO_QUEUE in the memory device MEM of the respective data flows. Thereby, each data packet is directed into one predetermined queue.

The dequeuing unit DQU is depicted in more detail comprising a second selection unit MUX and a dequeuing-logic-unit DL controlling the second selection unit MUX. The second selection unit MUX is controlled dependent on the from-queue-entry FROM_QUEUE in the memory device MEM in consideration of a timer module TM associated to the respective data flow. The second selection unit MUX may be a multiplexer unit being operable to select one particular queue for transmitting the respective data packet at the head of the selected queue.

The intermediate queue IQ can be selected by the enqueuing unit EQU to buffer incoming data packets. Furthermore, the intermediate queue IQ can be selected by the dequeuing unit DQU for transmitting data packets to the communication network LAN. The respective selection for the enqueuing unit EQU is done via an intermediate queue IQ entry in the to-queue-entry TO_QUEUE and/or the from-queue-entry FROM_QUEUE in the memory device MEM for the respective data flow.

Figure 4:
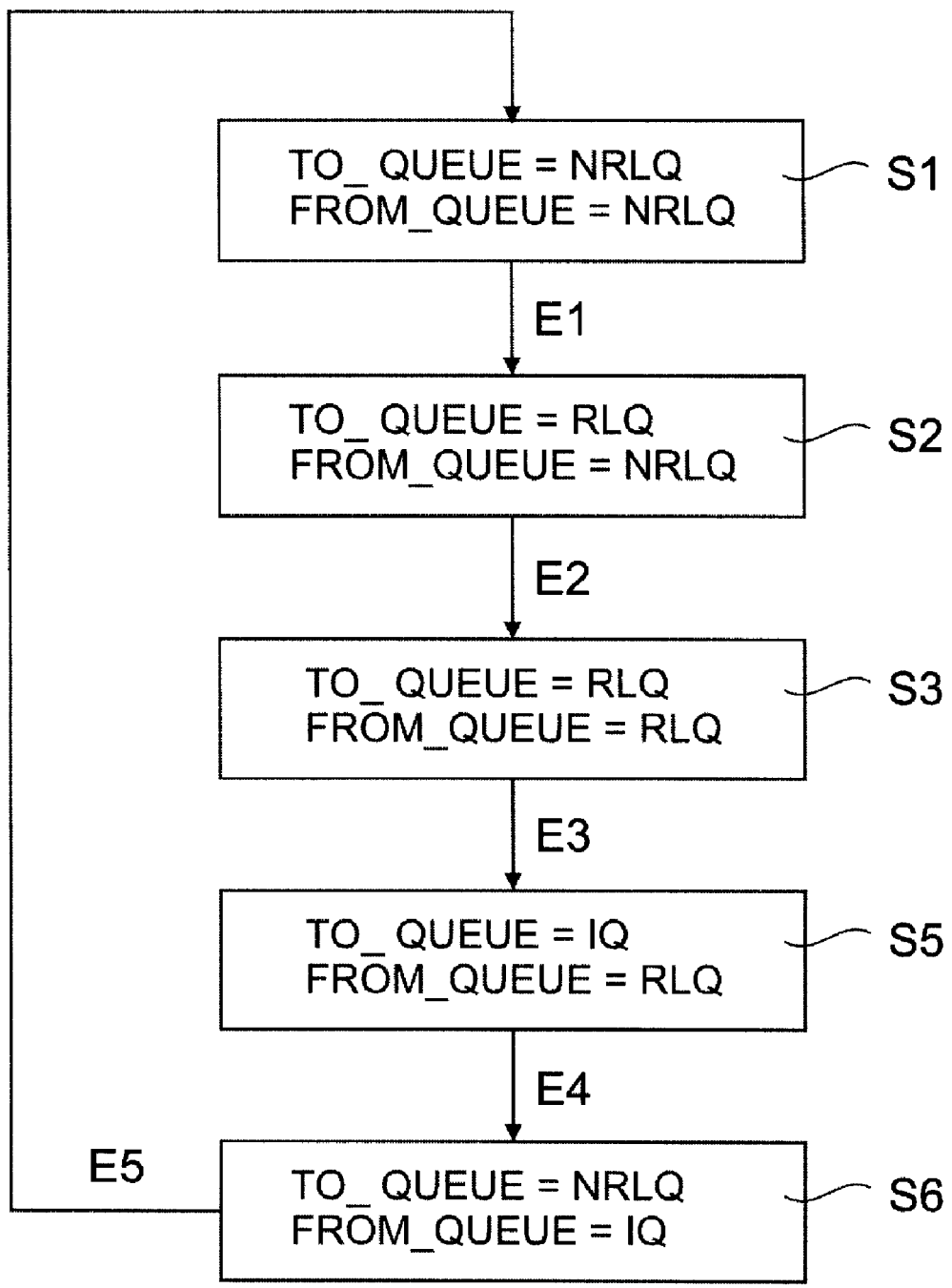
FIG. 4 is a second exemplary state diagrams.

The function of the network device NIC comprising the intermediate queue is described in more detail in FIG. 4.

FIG. 4 illustrates an additional state diagram of the finite-state-machine FSM in a network device NIC with an additional intermediate queue IQ and where state transitions occur dependent on only one event per state. Based on the transmission of the data flow F1 in a non-congested communication network LAN, the finite-state-machine FSM starts in a first state S1 which predetermines the non-rate-limited-queue NRLQ for both the to-queue-entry TO_QUEUE and the from-queue-entry FROM_QUEUE for the data flow F1 in the memory device MEM as described already in FIG. 2a.

The rate-limit-imposed-event E1 represents the detection and indication of a data congestion in the communication network LAN by the congestion manager CM. When the rate-limit-imposed-event E1 occurs the finite-state-machine FSM transitions to a second state S2 as described already in FIG. 2a.

The marker-at-head-of-NRLQ-event E2 represents the detection of the marked data packet of the data flow F1 in the non-rate-limited-queue NRLQ while the communication network LAN is still congested. When the marker-at-head-of-NRLQ-event E2 occurs the finite-state-machine FSM transitions to a third state S3 as described already in FIG. 2a.

The rate-limit-removal-event E3 represents a detected removal of the data congestion in the communication network LAN. When the rate-limit-removal-event E3 occurs the finite-state-machine FSM transitions to a fifth state S5. With the fifth state S5, the finite-state-machine FSM predetermines the intermediate queue IQ for the to-queue-entry TO_QUEUE for the data flow F1 but the from-queue-entry FROM_QUEUE remains unchanged. Using the to-queue-entry TO_QUEUE the memory device MEM controls the enqueuing unit EQU in such a way that data packets of the data flow F1, where were further supplied by the computer via interface IF, now are buffered to the intermediate queue IQ. Data packets of the data flow F1 transmitted with limited transmission rates are still read from the rate-limited-queue RLQ. When switching from the congested to non-congested communication network LAN, the last data packet of the data flow F1 in the rate-limited-queue RLQ is marked by setting its respective marker bit M.

The marker-at-head-of-RLQ-event E4 represents the detection of the marked data packet of the data flow F1 at the head of the rate-limited-queue RLQ while the communication network LAN is still non-congested. When the marker-at-head-of-RLQ-event E4 occurs the finite-state-machine FSM transitions to a sixth state S6. With the sixth state S6, the finite-state-machine FSM predetermines the non-rate-limited-queue NRLQ for the to-queue-entry TO_QUEUE for the data flow F1, and predetermines the intermediate-queue IQ for the from-queue-entry FROM_QUEUE. Using the to-queue-entry TO_QUEUE the memory device MEM controls the enqueuing unit EQU in such a way that data packets of the data flow F1 are buffered to the non-rate-limited-queue NRLQ. Using the from-queue-entry FROM_QUEUE the memory device MEM controls the dequeuing unit DQU in such a way that data packets of the data flow F1 are read from the intermediate queue IQ for transmission after transmitting the marked data packet at the head of the rate-limited-queue RLQ. With a further non-congested communication network LAN, the last data packet of the data flow F1 in the intermediate queue IQ is marked by setting its maker bit M.

Data packets associated with the intermediate queue IQ are typically transmitted with unlimited transmission rate analogous to data packets associated to the non-rate-limited-queue NRLQ.

When the communication network LAN remains non-congested and the marker-at-head-of-IQ-event E5 occurs, which represents the detection of the marked data packet of the data flow F1 in the intermediate queue IQ, the finite-state-machine FSM transitions to the first state S1 again and predetermines the non-rate-limited-queue NRLQ for both the from-queue-entry FROM_QUEUE and the to-queue-entry TO_QUEUE for the data flow F1.

Based on the data flow F1, a head-of-line blocking can occur if data packets of the data flow F1 are still transmitted with a limited transmission rate from the rate-limited-queue RLQ while subsequent data packets of the data flow F1 are already located in the non-rate-limited-queue NRLQ waiting for the transmission of the marked data packet in the rate-limited-queue RLQ. The subsequent data packets in the non-rate-limited-queue NRLQ of the data flow F1 can already move to the head of the queue while the marked data packet of the data flow F1 in the rate-limited-queue RLQ is still not transmitted. The data packet of the data flow F1 at the head of the non-rate-limited-queue NRLQ has to wait until the marked data packet of the data flow F1 in the rate-limited-queue RLQ is transmitted, thus blocking the transmission of subsequent data packets of other data flows in the non-rate-limited-queue NRLQ. The transition from the rate-limited-queue RLQ to the intermediate queue IQ before transition to the non-rate-limited-queue NRLQ can avoid the head-of-line blocking in case of switching from the congested to the non-congested communication network LAN.

Figure 5:
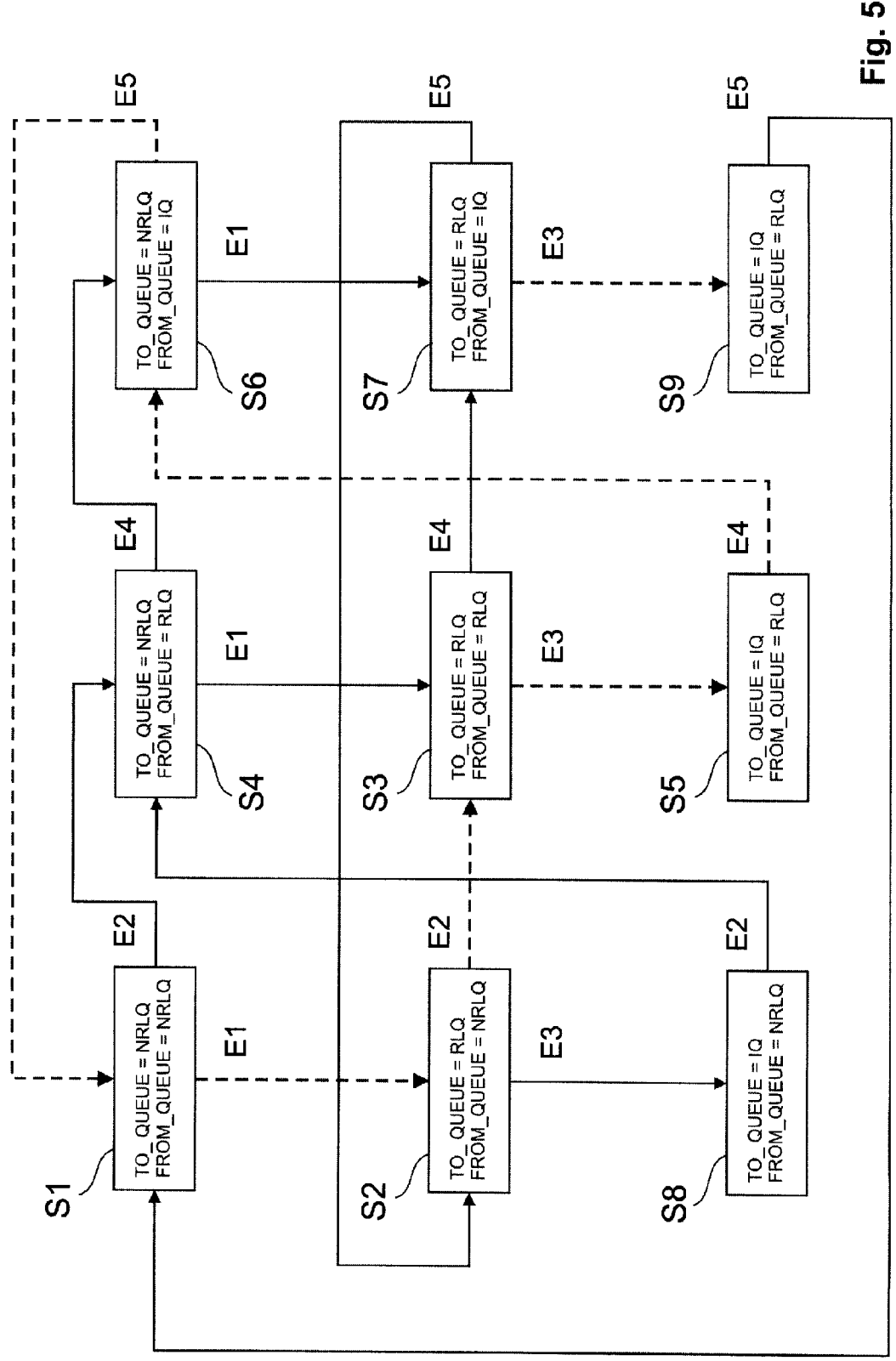
FIG. 5 is a third exemplary state diagram.

FIG. 5 illustrates an additional state diagram of the finite-state-machine FSM in a network device NIC with additional intermediate queue IQ and where state transitions occur dependent on one or more event per state analogous to FIG. 2b. According to FIGS. 2a and 2b the finite-state-machine FSM predetermines either the non-rate-limited-queue NRLQ or the rate-limited-queue RLQ for the to-queue-entry TO_QUEUE and for the from-queue-entry FROM_QUEUE. According to FIGS. 4 and 5, the to-queue-entry TO_QUEUE and the from-queue-entry FROM_QUEUE run through a predetermined sequence of queues. Starting with the non-rate-limited-queue NRLQ, the sequence typically continues with the rate-limited-queue RLQ, followed by the intermediate queue IQ, followed by the non-rate-limited-queue NRLQ.

The state transitions described already in FIG. 4 include states S1 to S3 and S5 and S6. The events linking those states in FIG. 4 are marked with dashed lines in FIG. 5. The remaining states are typically taken if rate-limit-imposed-events E1 or rate-limit-removal-events E3 occur before the respective marker-at-head-of-NRLQ-event E2, marker-at-head-of-RLQ-event E4 or marker-at-head-of-IQ-event E5 occur. For example assuming the second state S2, if the rate-limit-removal-event E3 occurs before the respective marker-at-head-of-NRLQ-event E2 occurs an eighth state S8 is taken. Following states are taken by the finite-state-machine FSM dependent on following event occurrences. To prevent an out-of-order buffering or transmission of data packets of the data flow F1, the predetermined sequence of queues is typically predetermined by the finite-state-machine FSM for the respective to-queue-entry TO_QUEUE and the respective from-queue-entry FROM_QUEUE. Exceptions from the predetermined sequence of queues can result in out-of-order transmission of data packets.

For example assuming the sixth state S6, if the rate-limit-imposed-event E1 occurs before the marker-at-head-of-IQ-event E5 occurs an seventh state S7 is taken.

A preferred embodiment of the memory device MEM is operable to store a time-stamp-entry for each data flow indicating a queue transition in the to-queue-entry TO_QUEUE. If for some reason a set marker bit M in a respective queue of a data packet of a respective data flow is lost or corrupted, then the associated from-queue-entry FROM_QUEUE is never updated because the finite-state-machine FSM is not able to detect the set marker bit M. With using the timestamp-entry for the respective data flow in the memory device MEM, a periodic check can be executed to force a predetermination of the queue specified for the respective to-queue-entry TO_QUEUE and also for the from-queue-entry FROM_QUEUE. For example, the periodic time associated to the periodic check can be chosen as the respective queue size divided by a minimum transmission rate associated to the respective queue.

A further preferred embodiment of the network device NIC is operable to generate a signal indicating that at least one queue is filled to a given degree with data packets. The signal can be transmitted via the interface IF to the associated computer or to external network components interconnected to the communication network LAN supplying data packets to the network device NIC. By indicating the filling level to a given degree, the computer and/or the network components can be notified that additional buffering of data packets is jeopardized due to a minimum availability or non-availability of free buffer entries in the respective queue.

Besides associating to-queue-entries TO_QUEUE and from-queue-entries FROM_QUEUE, as well as at least one timer module TM, to a single data flow, an association to a group of data flows is also possible, wherein the data flows of the respective groups is associated with identical limited transmission rates.

A further preferred embodiment of the network device NIC includes multiple rate-limited-queues RLQ, each associated to a predetermined range of limited transmission rates. Data packets of data flows are directed to the respective rate-limited-queue RLQ dependent on their associated limited transmission rate. This is done in such a way that data packets of data flows with transmission rates within the predetermined range of limited transmission rates are buffered to identical rate-limited-queues. This embodiment of the network device NIC reduces head-of-line blocking due to data packets with slower transmission rates being segregated from data packets with higher transmission rates within the same respective rate-limited-queue RLQ.

We claim:

1. A network device comprising:
    an interface to receive and/or transmit data flows from and/or to a communication network;
    multiple timer modules that are associated with and predetermine a transmission rate for a data flow and/or a group of data flows when data congestion in the communication network is indicated; and
    at least one rate-limited-queue which buffers the data flow when data congestion in the communication network is indicated;
    wherein data packets in the data flow are transmitted from the rate-limited-queue with a transmission rate predetermined by the respectively associated timer module when each data packet is at the head of the rate-limited-queue.

2. The network device according to claim 1, further comprising at least one non-rate-limited-queue which buffers data packets of the data flow and/or the group of data flows and transfers the data packets with an unlimited transmission rate in the case of a non-congested communication network.

3. The network device according to claim 1, wherein the timer modules are adjusted dependent on the data congestion indication of the communication network.

4. The network device according to claim 1, further comprising:
    an intermediate queue which buffers at least one remaining data packet of the data flow and/or the group of data flows in case of a switch from the indication of congested to non-congested communication network.

5. The network device according to claim 1, wherein:
    the network device is operable to mark a data packet of the data flow and/or the group of data flows buffered in one queue if at least one subsequent data packet of the data flow and/or the group of data flows is buffered in a different queue than the marked data packet; and the network device is operable to switch from the one queue to the other queue for data packet transmission dependent on the marked data packet at the head of the one queue.

6. The network device according to claim 1, wherein:

the network device is operable to insert an idle data packet associated to the data flow and/or the group of data flows into one queue and to mark the idle data packet;

the network device is operable to buffer at least one subsequent data packet of the respective data flow and/or the respective group of data flows in a different queue than the marked idle data packet; and the network device is operable to switch from the one queue to the other queue for data packet transmission dependent on the idle data packet at the head of the one queue.

7. The network device according to claim 5, further comprising a marker bit associated to each buffer-entry in the respective queue used to mark the data packet of the respective data flow and/or respective group of data flows by setting its marker bit.

8. The network device according to claim 1, further comprising:

a memory device operable to store a to-queue-entry and a from-queue-entry for each data flow and/or each group of data flows;

wherein the to-queue-entry predetermines a queue where data packets of the data flow and/or group of data flows are buffered to; and wherein the from-queue-entry predetermines where data packets of the data flow and/or group of data flows are read from for transmission.

9. The network device according to claim 8, further comprising a finite-state-machine which is operable to modify the to-queue-entries and the from-queue-entries of the memory device dependent on the data congestion indication of the communication network and dependent on a marked data packet in the respective queue.

10. The network device according to claim 9, further comprising a congestion manager which contains multiple timer modules and is operable to indicate a data congestion in the communication network and to adjust the timer modules dependent on the indication of the data congestion.

11. The network device according to claim 8, further comprising an enqueuing unit which is operable to direct data packets of the data flow and/or the group of data flows to one of the queues dependent on the to-queue-entry in the memory device of the data flow and/or the group of data flows.

12. The network device according to claim 8, further comprising a dequeuing unit which is operable to select a data packet of the data flow and/or the group of data flows in one of the queues for transmission dependent on the from-queue-entry of the data flow and/or the group of data flows and, when the respective data packet is buffered in the at least one rate-limited-queue, the transmission is dependent on the timer module associated with the data flow and/or the group of data flows.

13. The network device according to claim 1, wherein the network device is operable to give a signal indicating that at least one queue is filled to a given degree with data packets.

14. A method of operating a network device comprising the steps of:

receiving data flows from a communication network;

associating a data flow and/or a group of data flows to a timer module when data congestion in the communication network is indicated, whereby said timer module predetermines a transmission rate for the data flow and/ or group of data flows;

buffering the data flow in at least one rate-limited-queue when data congestion in the communication network is indicated; and transmitting to a communication network each data packet in the data flow with a transmission rate predetermined by the associated timer module when each data packet is at the head of the rate-limited-queue.

15. The method according to claim 14, further comprising the steps of:

buffering data packets of the data flow and/or the group of flows in a at least one non-rate-limited-queue when data non-congestion is the communication network is indicated; and transmitting to a communication network each data packet in the data flow with a transmission rate not limited by the associated timer module when each data packet is at the head of the non-rate-limited-queue.

16. The method according to claim 14, further comprising the step of adjusting the respective timer module dependent on the data congestion indication of the communication network.

17. The method according claim 14, further comprising the step of buffering at least one remaining data packet of the data flow and/or the group of data flows in an intermediate queue in case of a switch from the indication of congested to non-congested communication network.

18. The method according to claim 14, further comprising the step of marking a data packet of the data flow and/or group of data flows buffered in one queue if at least one subsequent data packet of the respective data flow and/or group of data flows is buffered in a different queue than the marked data packet.

19. The method according to claim 14, further comprising the steps of:

inserting an idle data packet associated to the data flow and/or group of data flows into one queue; and marking the idle data packet while at least one subsequent data packet of the data flow and/or the group of data flows is buffered in a different queue than the marked idle data packet.

20. The method according to claim 14, further comprising the step of generating a signal indicating that at least one queue is filled to a given degree with data packets.

* * * * *